United States Patent [19]

Doree

[11] 4,408,363
[45] Oct. 11, 1983

[54] THREAD CONDITIONING DEVICE

[76] Inventor: Donald A. Doree, 1768 Blair St., Saint Paul, Minn. 55104

[21] Appl. No.: 255,458

[22] Filed: Apr. 20, 1981

[51] Int. Cl.³ .......................... B23G 1/26; B23G 5/10; B23G 9/00
[52] U.S. Cl. ........................................ 10/1 B; 15/105; 30/172; 408/227
[58] Field of Search ................... 30/172, 276; 408/227, 408/228, 229; 15/93 R, 105; 10/1 B, 111, 86 A

[56] References Cited

U.S. PATENT DOCUMENTS

| | | | |
|---|---|---|---|
| 1,312,345 | 8/1919 | Newman | 10/1 B |
| 1,606,186 | 11/1926 | Shaefer | 10/1 B |
| 1,857,493 | 5/1932 | Campaigne | |
| 2,054,745 | 9/1936 | Goob | 10/111 X |
| 2,079,746 | 5/1937 | Morgan | 10/86 A |
| 2,244,138 | 6/1941 | Brown | |
| 2,540,606 | 2/1951 | Beezley | 10/1 B |
| 2,567,480 | 9/1951 | Heldenbrand | 10/1 B |
| 2,896,495 | 7/1959 | Crawford | 85/32 |

Primary Examiner—Jimmy C. Peters
Attorney, Agent, or Firm—Anthony G. Eggink

[57] ABSTRACT

The thread conditioning device is for rotational movement about a threaded bolt to remove corrosion and debris and to otherwise condition the bolt threads for further use. The device or chaser includes a body having an opened and generally C-shaped configuration when viewed cross sectionally to its axis of rotation. The body of the device includes an interior threaded surface to engage the threads of the bolt to be conditioned, an exterior surface to mechanically engage, grasp and rotate the device, and two generally opposing end surfaces. The open portion of the C-shaped body is defined by two lateral surfaces which extend between the opposing end surfaces from the interior surface to the exterior surface of the device. The two lateral surfaces preferably form positive, acute angles relative to the interior surface of the body when viewed cross sectionally. The intersections of the lateral surfaces and the interior threaded surface form two generally spacially opposing plowing edges of the device. The body is of a deformable and resilient construction to allow the plowing edges to be brought in closer proximity when mechanical forces are applied to the exterior surface of the device. The rotational movement of the device about a threaded bolt allows the plowing edges to condition the bolt threads, allows the resultant debris to egress thru the open portion of the body, which, additionally, allows controlled plowing action forces to be applied on the plowing edges by the user of the device.

16 Claims, 4 Drawing Figures

THREAD CONDITIONING DEVICE

This invention relates to a device for conditioning threads of a bolt. Particularly, this invention relates to a unitary, C-shaped device for rotational movement about a threaded bolt to remove corrosion and debris therefrom and to otherwise condition the bolt threads for further use.

Thread conditioning devices according to the invention are useful for cleaning and restoring the threads of a bolt which have been corroded, covered or filled with debris such as dirt or rust, and those which have been damaged such as being burred or flattened. And, these devices are especially useful for aiding in the removal of a nut which has been corroded onto a threaded bolt.

Often times after a nut has been placed onto a bolt and has remained there for a period of time, corrosion or collection of debris on the exposed threaded portion of the bolt prevents the subsequent easy removal of the nut. Damaged threads at the exposed threaded portion of the bolt presents the same difficulty. As a result, the attempted removal of such a nut often times results in stripped threads, broken bolts and great physical and mental exhaustion.

In the past, several types of devices have been proposed to clean and otherwise restore thread bolts so that the subsequent rotation of a nut thereon can be effectuated. However, these devices have been difficult and limited in use, complex in construction, ineffective and costly. And, despite the longstanding need for a simple and inexpensive to manufacture and utilize device for the above mentioned purposes, none insofar as is known has been developed. A practical, inexpensive and effective thread conditioning device is provided by the teachings of this invention.

In summary, this invention provides a thread conditioning device for cleaning, restoring and otherwise truing the threads of a bolt which have been damaged or covered and filled with debris, such as corrosion, dirt, rust and the like. The device or chaser includes an opened, generally C-shaped body when viewed cross sectionally to its axis of rotation.

The body of the device has a generally circular interior threaded surface to engage the threads of the bolt to be conditioned, an exterior surface to mechanically engage, grasp and rotate the device, and two generally opposing end surfaces.

The open portion of the C-shaped body is defined by two lateral surfaces which extend between the opposing end surfaces from the interior threaded surface to the exterior surface of the device. The two lateral surfaces optimally form positive, acute angles with respect to the interior surface of the body when viewed cross sectionally.

The intersections of the lateral surfaces and the interior threaded surface of the body form or define two spacially opposing plowing edges. The plowing edges extend between the two opposing end surfaces of the body.

The opened and generally C-shape body of the device is of a deformable and resilient construction to allow a user of the device to bring together or squeeze the plowing edges onto the threads to be conditioned by the predetermined application of forces onto the exterior surface of the body. The plowing edges restore the contours of the threads of the bolt as the device is rotated onto and from the bolt to be conditioned. The debris which is loosened from the bolt threads is removed from the device or chaser by moving across the acute angled lateral surfaces and out through the opened portion of the C-shaped body.

Additionally provided by the invention are thread conditioning device embodiments which utilize various interior thread designs, lateral surface angles and surface hardening characteristics. Also provided is a set of devices which have incremental inside diameter changes and which are especially useful for the typical user of this art. All embodiments, however, present an opened, generally C-shaped body for a device which is easy to manufacture and use, and which is effective and versatile.

These and other benefits of this invention will become clear from the following description by reference to the drawings, wherein.

Figure 1:
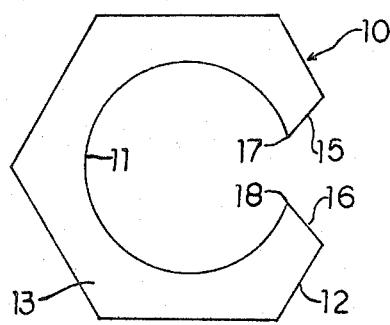
FIG. 1 is a schematic lateral side plan view of a thread conditioning device of the invention.
Figure 2:
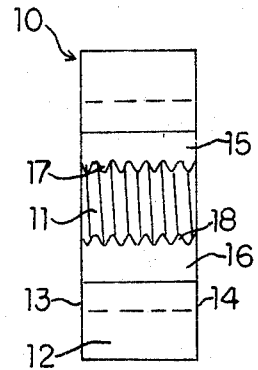
FIG. 2 is a schematic frontal view of the thread conditioning device shown in FIG. 1.
Figure 3:
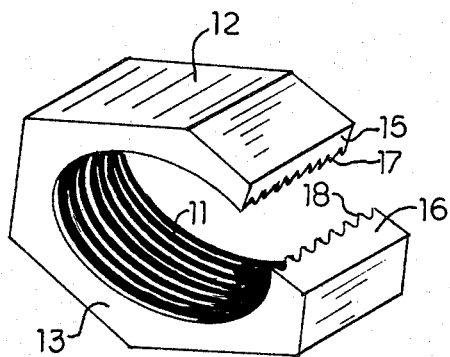
FIG. 3 is a schematic perspective view of the thread conditioning device of the invention; and, FIG. 4 is a schematic lateral side plan view showing the thread conditioning device of the invention in use on a corroded bolt having a nut thereon.

Referring to FIGS. 1,2 and 3, a thread conditioning device or chaser 10 is illustrated as having a generally C-shaped body when viewed cross sectionally to its axis of rotation. The body has an opened portion which extends from its exterior surface 12 to its interior threaded surface 11. The device 10 is further shown to have two generally opposing and planar end surfaces 13 and 14, and two lateral surfaces 15 and 16 which define the open portion of the C-shaped body of the device.

Two spacially opposing plowing edges 17 and 18 are illustrated at the respective intersections of lateral surfaces 15 and 16 with the interior threaded surface 11. FIG. 1 further shows positive or acute angles between lateral surfaces 15 and 16 and the interior threaded surface 11. These positive angles which are less than 90 degrees when measured from the tangential points with surface 11 at plowing edges 17 and 18 are important to the functionality of the device as will be discussed.

As shown in the drawings, the exterior surface 12 of the thread conditioning device or chaser 10 is of a hexagonal cross sectional configuration. Exterior surface 12 is for the mechanical engagement to grasp and rotate the device. Although the exterior surface could as well be square or circular, having rough or knurled peripheries for mechanical engagement, the hexagonal design allows the device 10 to be easily adapted for engagement by ordinary wrenches or vise grips. The primary purpose of the exterior surface 12 is to allow the leveraged rotation of the device, and to transport mechanical forces applied to it to the plowing edges 17 and 18.

The interior threaded surface 11 is for engaging and moving the device 10 along the threads of the bolt to be conditioned and cleaned. These threads obviously will correspond to the threads of the bolt whether having a left or right handed thread design, and will vary from fine to course threads. For example, thread size is generally determined by the number of threads per inch, and a numeral 20 would, therefore, designate 20 threads to the inch. Although the foregoing describes what is termed as a standard thread size, other common thread designations include the SAE and metric thread size designations.

Another important dimension of device 10 is its interior diameter. Again, this dimension for a specific device 10 is dependent on the outside diameter of the bolt to be conditioned. A tolerance factor is common, however, to ensure that a given inside diameter of a device will thread onto a corresponding outside diameter bolt. As is standard in the industry, the diameter dimension is generally given in conjunction with the thread size. For example, the designation ¼×20 would indicate a ¼ inch diameter having 20 threads per inch.

Thus, one specific thread conditioning device would be adaptable for use with one specific sized bolt. Therefore, a set of these devices would present a commercially viable and useful tool for machinists, mechanics and others. For example, a set of devices which incrementally change in inside diameter can be provided for use with a specific thread design. A set ranging in inside diameter from ¼ inch to one inch at one sixteenth inch increments would be an example of one such set.

Figure 4:
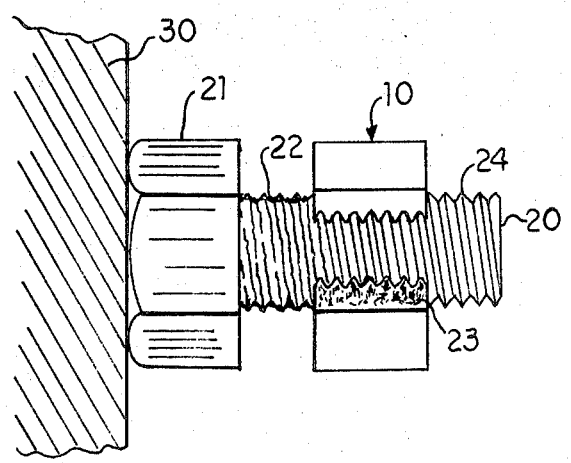

FIG. 4 illustrates the utility of the thread conditioning device of the invention. A threaded bolt 20 is shown extending from a body or wall 30, and having a nut 21 tightened onto bolt 20 and abutting wall 30. Due to corrosion, rust, accumulation of dirt and debris, or the flattened or burred disfigurement of the bolt threads as generally indicated as portion 22 of bolt 20, the nut 21 is immovable or frozen. Instead of expending much physical and mental energy, and in addition to causing probable irreparable damage to nut 21, bolt 20, or both, by attempting to rotate nut 20, the device of the invention is utilized.

The thread conditioning device or chaser 10 is threaded onto bolt 20, and, preferably, a lubricating liquid or spray is initially applied to penetrate the corroded bolt portion 22 and nut 21. By predetermined application of force to the exterior surface 12 of the device, if necessary, the plowing edges 17 and 18 dig between and about the threads of the bolt. The loosened corrosion and debris slides or moves onto the lateral surfaces of the device and is then egressed from the device through the open portion of the C-shaped body as indicated at 23.

After the passage of rotated device 10, the conditioned threads 24 remain on bolt 20. After the chaser rotated about bolt 20 abuts nut 21, it is reversed in rotational direction and removed. The removal process, likewise, aids in the conditioning of bolt 20. Nut 21 is now capable of removal onto the conditioned threads that remain, and, generally, this can be accomplished by the utilization of the same mechanical leveraging tool employed to rotate the device 10.

The thread conditioning device of the invention can be easily manufactured by removing a generally triangular portion or sector at adjoining sides of a hexagonal metal nut, as can be seen in the drawings. This nut, as mentioned above, can have a square, hexagonal or circular exterior configuration, so long as it can be engaged by a mechanical leveraging and grip tool.

It has been found with respect to the hexagonal configuration that a removed generally triangular portion or sector from adjoining exterior side surfaces functions well when a positive angled lateral surface arrangement is produced. This angle, when measured at its outside face with respect to a lateral surface should be less than 90 degrees, and, optimally, be 80 degrees. It is important to note that such acute angled surfaces at particularly the plowing edge, allows the user of the device to provide a mechanical plowing or biting force at the plowing edge, and the acute angled lateral surfaces allow easy egress of the removed debris through the opened portion of the C-shaped body to prevent the debris from hampering the effectiveness of the conditioning process.

Additionally, it has been found that surface hardening of the device body is beneficial. Obviously, the surface of the device 10, especially the interior threaded surface 11, plowing edges 17 and 18, and lateral surfaces 15 and 16, should be harder than the metal and debris of the bolt to be conditioned sothat damage to device 10 is prevented. This surface hardening can be easily accomplished to an ordinary metal nut made of cold rolled steel, for example, by a case hardening process. A surface hardening which hardens approximately 0.010 inches of a nut surface has been found sufficient for conditioning purposes.

Although the device of the invention is designed to condition existing corroded bolt threads, it is also possible to manufacture threads on unthreaded bolt stock by utilizing this device. The relative hardness differences between the metals of the device and the bolt stock should be great enough to prevent damage to the interior threads of the device, and the utilization of a leading thread arrangement at the end surfaces of the device would also be necessary.

Additionally, the thread conditioning device has generally been described heretofore as having two acute angled lateral surfaces. However, only one such surface, particularly at the corresponding plowing edge, is necessary to accomplish the function of the device. Two such surfaces allows the device to be used from either direction, i.e., placing either end surface of the device onto the bolt to be conditioned. And, two such surfaces provide conditioning action to the bolt threads as the device is rotated onto and from the bolt.

As many changes are possible to the embodiments of this invention utilizing the teachings of the invention, the descriptions above and the accompanying drawings should be interpreted in the illustrative and not in the limited sense.

That which is claimed is:

1. A device for rotational movement about a threaded bolt to condition the threads of the bolt, said device comprising a unitary body essentially having an opened, generally C-shaped cross section to its axis of rotation, said unitary body having an interior threaded surface to engage the threads of the bolt to be conditioned, an exterior surface for direct mechanical engagement to grasp, squeeze and rotate said device, two generally C-shaped end surfaces, and two opposing lateral surfaces which extend between said end surfaces from said interior surface to said exterior surface, one each said opposing lateral surface essentially having an acute angular disposition being in a range of 70 degrees to 90 degrees as measured tangentially from said interior surface to said exterior surface of said C-shaped body, said body further having two spacially opposing plowing edges at the intersections of said interior surface and said two opposing lateral surfaces, said C-shaped body essentially being of a deformable and resilient construction to allow said opposing plowing edges to be moved in closer spacial proximity to each other by the application of squeezing mechanical forces to said exterior surface of said device C-shaped body, whereby, the rotational movement of said device about a threaded bolt allows said plowing edges to condition the threads of the bolt, allows resultant debris to egress thru the opened portion of said C-shaped body between said opposing lateral surfaces, and allows the user of said device to directly control plowing action forces effective at said plowing edges by predetermined squeezing mechanical engagement to said exterior surface of said C-shaped body of said device due to the deformable and resilient construction thereof as said device is rotated onto and from the threads of a bolt to be conditioned.

2. The device of claim 1 wherein said C-shaped body is of a cold rolled steel construction.

3. A device of claim 2 wherein said C-shaped body has a case hardened surface construction.

4. The device of claim 1 wherein said exterior surface has an opened, generally hexagonal configuration relative to its axis of rotation, whereby said hexagonal shape exterior surface can be engaged for grasping and rotating said device by a common wrench having a pair of generally parallel gripping surfaces.

5. The device of claim 4 wherein said opened portion of said C-shaped body is defined by the extension of each said lateral surfaces from said interior surface to adjoining sides of said hexagonal shape exterior surface.

6. The device of claim 5 wherein said lateral surfaces extending to said adjoining sides of said hexagonal exterior surface form 80 degree angles thereto.

7. A set of thread conditioning devices comprised of a plurality of devices according to claim 1, each device of said set having a predetermined inside diameter for rotational movement about a predetermined exterior bolt diameter, said plurality of devices having similarly disposed interior threads and varying generally incrementally in inside diameter from each other.

8. The set of devices of claim 7 wherein said respective C-shaped bodies of said devices are made of a cold rolled steel construction having been case surface hardened.

9. The set of devices of claim 8 wherein each said device has at least one positive, acute angled lateral surface relative to its interior surface, whereby, the resultant acute angled plowing edges increase the conditioning effectiveness of said devices.

10. A chaser to recondition the threads of a bolt comprising a unitary C-shaped body having internal threads and an external surface to receive a tool to squeezably and directly engage the chaser body for rotation, said unitary C-shaped body essentially being of an inwardly deformable and resilient material and essentially having opposing lateral surfaces which extend from said internally threaded area to said external surface, said C-shaped body further having opposing end surfaces and said internally threaded area essentially being continuous between said end surfaces, said C-shaped body having at least one plowing edge defined by the intersection of one said lateral surface and said internal threading, said lateral surface defining said plowing edge essentially forming an acute angle being in the range of 70 degrees to less than 90 degrees with respect to said internal threading, whereby, said chaser is usable on a threaded bolt of any length by rotating said C-shaped body thereabout, and, whereby, the user of said chaser can effectively control the plowing action thereof by inwardly squeezing said deformable and resilient C-shaped body as said chaser is rotated about a threaded bolt to be conditioned.

11. The chaser of claim 10, wherein said C-shaped body is constructed of cold rolled steel having a case hardened surface.

12. The chaser of claim 11, wherein said C-shaped body has an external surface of a generally hexagonal configuration when viewed along its axis of rotation.

13. The chaser of claim 12, wherein said acute angled lateral surface has an angle upward from said plowing edge which is 80 degrees.

14. A chaser to condition the threads of a bolt by its rotation about the threads of a bolt, said chaser comprising a nut with a threaded hole therethrough essentially having a V-shaped wedge section removed to form a C-shaped body having opposing, flat, lateral surfaces, at least one each said lateral surface extending from said threaded area at an acute, positive angle essentially ranging between 70 degrees to less than 90 degrees so as to form an a pair of opposing acute angled plowing edges for expelling debris removed from the threads of a bolt, said C-shaped body being of a unitary, deformable and resilient construction to permit said C-shaped body to be directly compressed inwardly for placing increased pressure at said opposing acute angled plowing edges, whereby, said chaser is able to condition the threads of an elongated bolt by its squeezing rotation thereabout, and whereby the debris from the conditioned threads are expelled by each said plowing edge through the opening in said C-shaped body.

15. The chaser of claim 14, wherein said C-shaped body is constructed of cold rolled steel having a case hardened surface.

16. The chaser of claim 14, wherein said C-shaped body is formed of a hexagonal nut having a V-shaped section removed therefrom.

* * * * *